United States Patent
Atarashi et al.

(10) Patent No.: US 6,173,312 B1
(45) Date of Patent: *Jan. 9, 2001

(54) SYSTEM FOR RELIABLY CONNECTING A CLIENT COMPUTER TO A SERVER COMPUTER

(75) Inventors: Yoshifumi Atarashi, Zama; Kenji Hayashi, Hadano; Naoya Ikeda, Ebina; Shoichiro Yamaguchi, Hiratsuka, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/890,214

(22) Filed: Jul. 9, 1997

(30) Foreign Application Priority Data

Jul. 9, 1996 (JP) .................................... 8-178861

(51) Int. Cl.[7] .............................................. G06F 15/16
(52) U.S. Cl. .......................... 709/203; 709/201; 709/238; 709/245; 711/202; 711/203; 714/4; 370/409
(58) Field of Search .................... 395/200.33, 200.79, 395/182.04, 182.02; 709/102, 105, 201–203, 217–221, 223–224, 227–230, 236–239, 245–246, 249–250; 714/1, 4, 6; 711/200, 202–203, 206; 370/409, 396–397

(56) References Cited

U.S. PATENT DOCUMENTS

| | | | |
|---|---|---|---|
| 5,005,122 | * 4/1991 | Griffin et al. | 709/203 |
| 5,490,252 | * 2/1996 | Macera et al. | 709/249 |
| 5,548,724 | * 8/1996 | Akizawa et al. | 709/203 |
| 5,603,029 | * 2/1997 | Aman et al. | 709/105 |
| 5,633,999 | * 5/1997 | Clowes et al. | 714/5 |
| 5,781,716 | * 7/1998 | Hemphill et al. | 714/4 |
| 5,796,934 | * 8/1998 | Bhanot et al. | 714/4 |
| 5,809,233 | * 9/1998 | Shur | 709/230 |
| 5,812,751 | * 9/1998 | Ekrot et al. | 714/4 |
| 5,828,847 | * 10/1998 | Gehr et al. | 709/239 |
| 5,948,069 | * 9/1999 | Kitai et al. | 709/240 |
| 5,974,452 | * 10/1999 | Karapetkov et al. | 709/218 |
| 6,021,263 | * 2/2000 | Kujoory et al. | 709/232 |
| 6,021,433 | * 2/2000 | Payne et al. | 709/219 |
| 6,081,833 | * 6/2000 | Okamoto et al. | 709/213 |
| 6,085,238 | * 7/2000 | Yuasa et al. | 709/223 |

* cited by examiner

Primary Examiner—Krisna Lim
Assistant Examiner—Bharat Barot
(74) Attorney, Agent, or Firm—Mattingly, Stanger & Malur, P.C.

(57) ABSTRACT

In order to realize server switching to a backup server from a working server without changing any setting on a client computer, a network system is provided having a network supervising means for supervising operations of a plurality of server computers connected to the network, a server switching means for realizing server switching in which the backup server computer alternatively executes the server function of the working server computer by virtually setting the address of the working server computer connected to the network as the address of the backup server computer. A packet converting means is provided for converting the packet transmitted and received between the working server computer and the client computer into the packet transmitted and received between the backup server computer and the client computer.

22 Claims, 12 Drawing Sheets

SYSTEM FOR RELIABLY CONNECTING A CLIENT COMPUTER TO A SERVER COMPUTER

FIELD OF THE INVENTION

The present invention relates to a high reliability network system for improving reliability of communications performed among a plurality of server and client computers connected in a network. In particular, the present invention relates to a technology which can effectively be applied to a high reliability network system to realize transfer of server function, backup and load dispersion, etc. without suspending the operations in the network.

BACKGROUND OF THE INVENTION

In conventional computer systems, a plurality of terminals are generally connected via a network around a host computer. Thereby, the host computer can realize concentrated processes. In such a conventional system, a circuit switching network and packet switching network according to a standard protocol X.25 has been introduced.

Since the reliability of the circuit switching was left in hands of the line provider, in order to have backup of the server computers, it was necessary to previously make registration of a calling destination in the event of a fault to a line control apparatus.

Moreover, the backup system according to X.25 is realized on the basis of the concept of transfer of terminated calls as can be seen in X.25 of CCITT (Consultative Committee for International Telephony and Telegraphy). In the case of transfer of terminated calls, a list of the transfer destinations to be used for transfer when the termination side is defective, or when there is a busy condition, is previously provided at the time of extending a virtual circuit depending on X.25. Thereby, transfer is attempted in the sequence of the list until the virtual circuit is normally extended according to the list of such transfer destination and communication can be realized.

On the other hand, in the current trend of down-sizing, computer systems have gradually shifted from a system for executing centralized processes with a large size computer to a distribution type server-client system consisting of a server computer formed from a work station, or the like, and a client computer mainly formed from a personal computer, or the like.

Moreover, as the connectivity of a network is assured with the same protocol not only in the LAN (Local Area Network) but also in WAN (Wide Area Network) by means of an IP (Internet Protocol) based network such as the internet, a large scale server-client system utilizing the same protocol network explained above can be established. Also, recently, portable type computers are frequently connected to such a server-client system for the purpose of communication and various discussions are now being made for IP for mobile communication which is used for moving the portable type computer in order to connect it to different networks.

FIG. 13 illustrates the structure of a network utilizing an IP for mobile communication of the related art. In FIG. 13, 1300, 1310 and 1320 designate LANs; 1301, 1311 and 1321 designate routers; 1302, 1303, 1304 and 1305 designate clients; and 1312 designates the client for mobile communication. The addresses are assigned in the network utilizing the IP for mobile communication of the related art. When the client 1312 for mobile communication is moved to LAN 1320 from LAN 1310, and the client for the mobile communication 1312 has an identification address corresponding to the existing IP address and a virtual address which is set virtually in the network of the transfer destination.

In the existing network system, regarding the address of the client 1312 for mobile communication, the identification address and virtual address are both indicated as "b.a" when the client is connected to LAN 1310 and the address "b.a" is used for communication between the client 1312 for mobile communication and clients 1302 to 1305. When the client 1312 for mobile communication is moved and connected to LAN 1320, the address which is not used in LAN 1320, for example, "c.a" can be set as the virtual address. When a packet for address "b.a" is transmitted from the clients 1302 to 1305, the routers 1301, 1311 and 1321 transmit the packet to the client 1312 for mobile communication moved to LAN 1320 by transferring the packet to the address "b.a" to the address "c.a". Thus, when client 1312 for mobile communication is moved to a different LAN segment, communication can be made between the client 1312 for mobile communication and the clients 1302 to 1305 without changing the setting of the IP address of the client 1312 for mobile communication in the side of the clients 1302 to 1305.

On the other hand, in a large scale server-client system structured as explained above, a plurality of server computers have usually been duplicated to provide against the faults occurring in the server computers, by selectively using two adjacent server computers as the working or backup server computers. The working server and backup server explained above have been connected with an exclusive bus or network, but a plurality of server computers for working server and backup server must be located at the position of the same LAN segment. In addition, according to a certain method, the working server is switched to the backup server in the distant area by allocating the backup server in the distant area. But in this method, the transfer of terminated calls or the method similar to such transfer of terminated calls has been employed.

SUMMARY OF THE INVENTION

The inventors of the present invention have found the following problems as a result of reviewing such related art. First, backup or switching for the server computer connected by WAN can be realized through circuit switching or packet switching, but software using IP is now used according to a standard due to the influence of internet in the field of the WAN and reconsideration must be done in the basis of IP even for the system for executing backup and switching of the server computer. Second, in the existing network system, a list of transfer destinations for the fault is controlled statically but modification of structure of network or change of address often occur in response to the increase in the number of devices connected to the network. Moreover, contents of the list of transfer destinations must be updated for each change of address in the static management of the transfer destination list, resulting in the problem that the packets to the working server are not correctly transferred to the backup server if updating of the transfer destination list is delayed when the working server fails and switching to the backup server is executed.

In addition, in the network of the related art, the transfer destination list can immediately be updated when a fault occurs in the working server and the working server can be switched to the backup server through the transfer of terminated call. However, the address of the server computer accessed is often defined statically in the client computer and it has also been required to change the address of the server computer as the transmission destination in the side of client computer at the time of transmitting or receiving the packets between the backup server and client computer.

It is therefore an object of the present invention to provide a technique for switching from a working server to a backup server without changing the setting on the client computer.

It is another object of the present invention to provide a technique for switching between the working and backup servers connected on different networks without changing the setting on the client computer.

It is still another object of the present invention to provide a technique for selecting the optimum path to the backup server from the client computer when the working server is switched to the backup server.

It is yet another object of the present invention to provide a technique for switching the server to a backup server having no server switching function.

In order to realize the above-mentioned objects of the present invention, some aspects of the invention are summarized below:

(1) According to one aspect of the present invention, a high reliability network system connecting a plurality of server computers and client computers to a network includes a network supervising means for supervising operations of a plurality of server computers connected to the network. A server switching means is provided for switching the server to alternatively realize the server function of the particular server computer with the other server computer by virtually setting the address of the particular server computer connected to the network as the address of the other server computer. Also, a packet converting means is provided for converting the packets transmitted between the particular server computer and client computers into the packets transmitted between the other switched server computer and the client computer.

The network supervising means of the high reliability network system transmits, with a constant time interval, a keep alive packet to the working server operating as the server computer among a plurality of server computers connected to the network. The network supervising means checks whether or not the answering packet is received from the working server for the keep alive packet. When the answering packet is not received, the network supervising means transmits the server switching instruction to the server switching means of the backup server as the backup server computer.

The server switching means of the backup server, having received the server switching instruction, sets the address of the working server as the virtual address of the backup server and notifies, to the packet converting means explained above, that the working server has been switched to the backup server with the virtual address setup as explained above. The packet converting means, having received the server switching information, receives the packet transmitted from the client computer to the working server and changes the address of the transmitting destination from the working server into the address of the backup server.

The backup server, having received the packet, executes the server function of the working server by executing the process corresponding to the received packet and sets up, when transmitting an answering packet to the client computer which transmitted the packet, the address of the working server as the source address of the answering packet.

Thus, in such a high reliability network system, if sufficient processing becomes impossible due to various causes such as a fault occurring in the working server, the working server is dynamically switched to the backup server to virtually set up the address of working server for the backup server. Thereby, the server function of the working server is transferred to the backup server to execute the process as if the working server were transferred to the backup server. Therefore, the client computer of the high reliability network system is capable of continuing communication with the server, even after the working server is switched to the backup server, without changing any setting on the client computer.

(2) In the high reliability network system described above in item (1), the other server computer which alternatively executes the server function of the particular server computer through the server switching means is connected to the other network which is connected, via an internetwork apparatus, to the network in which the particular server computer is connected. It is assumed that the working server and the backup server are connected to different networks and a plurality of networks are connected with routers as an internetwork apparatus. The client computer which executes transmission and reception of the packet with the working server or backup server is also assumed to be connected with any one of the working server or backup server or connected with the other network which is connected via a router to the network to which the working server or backup server is connected.

The network supervising means of the high reliability network system transmits the keep alive packet, with a constant time interval, to the working server which is connected to the particular network to operate as the server computer. The network supervising means checks whether the answering packet can be received or not from the working server for the keep alive packet and transmits the server switching instruction, when the answering packet is not received, to the server switching means of the backup server connected to the other network which is different from the first network. The server switching means of the backup server having received the server switching instruction sets the address of the working server as the virtual address of the backup server and informs, to the router to be connected to the working server, that the working server is switched to the backup server with the virtually set address.

Upon reception, by the working server, of the packet transmitted from the client computer, the packet converting means of the router, having received the server switching information, converts the destination address of the packet to the address of a backup server connected to the other network and transmits the packet having changed the destination address to the backup server. The backup server, having received the packet, executes the server function of the working server by performing the processes corresponding to the received packet and sets the address of working server to the source address of the answering packet to transmit it to the client computer. Thus, when sufficient process can no longer be realized due to causes such as a fault occurring in the working server, the working server is dynamically switched to the backup server to virtually set the address of the working server connected to the particular network to the backup server connected to the other server and transfers the server function of the working server to the backup server to execute the process as if the working server were transferred to the backup server. As a result, the client computer of the high reliability network system is capable of continuing communication with the server without changing any setting on the client computer by making communication with the backup server to which the address of the working server has been set virtually even after the working server connected to the particular network is switched to the backup server connected to the other network.

Therefore, since the destination address of the packet to the working server connected to the particular network is changed to the address of the backup server connected to the other network, the working server and the backup server connected to different networks can be easily switched without changing any setting on the client computer.

(3) In the high reliability network system described above in items (1) or (2), a route changing means is also provided to change the route of the packet transmitted between the particular server computer and client computer to the route of the packet transmitted between the other server computer and client computer for which the server switching has been performed. The network supervising means of the high reliability network system transmits a server switching instruction to the server switching means of the backup server provided as a backup server computer when the answering packet is not received from the working server for the keep alive packet.

The server switching means of the backup server, having received the server switching instruction, sets the address of the working server to the backup server as the virtual address and informs all routers of the high reliability network system that the working server is switched to the backup server of the virtual address. The route changing means of the routers, having received the server switching information, changes the route information of the routers under the assumption that the working server has been transferred to the position of the backup server.

Upon reception of the packet to the working server transmitted from the client computer, the packet converting means of the router obtains the route to the backup server, depending on the route information changed as explained above, and thereafter changes the destination address of the packet to the working server to the address of the backup server in order to transmit the packet whose destination address is changed to the backup server. The backup server, having received the packet, executes the process for the received packet to execute the server function of the working server and moreover sets the address of the working server, at the time of transmitting the answering packet to the client computer having received the packet, to the source address of the answering packet to transmit it to the client computer.

Therefore, since the route information of router is changed under the assumption that the working server is transferred to the position of the backup server when the working server is switched to the backup server, the optimum route to the backup server from the client computer can be selected when the working server is switched to the backup server.

(4) In the high reliability network system described in the items (1) to (3), a protocol translator is provided to convert, when the particular server computer is switched to the other server computer having no server switching function, the packet transmitted to the particular server computer from the client computer into the packet transmitted to the other server computer. When the working server is switched to the backup server having no server switching function, the packet to the working server is converted to the packet to the protocol translator and the converted packet is stored in the protocol translator. The protocol translator converts the received packet to the packet to be transmitted to the backup server and then transmits the converted packet to the backup server. The backup server executes the process depending on the contents of the received packet and transmits, when response is requested, the answering packet thereof to the protocol translator. The protocol translator converts the received answering packet to the answering packet from the working server and issues a response to the client computer.

Therefore, since the packet to be transmitted to the working server is converted to the packet to the backup server after the working server is switched to the backup server, server switching to the backup server having no server switching function can be attained.

These and other objects, features and advantages of the present invention will be more apparent in view of the following detailed description of the present invention in conjunction with the drawings.

DETAILED DESCRIPTION OF THE PREFERRED EMBODIMENTS

The following is a detailed description of the preferred embodiments of the present invention which is made in conjunction with the drawings.

Figure 1:
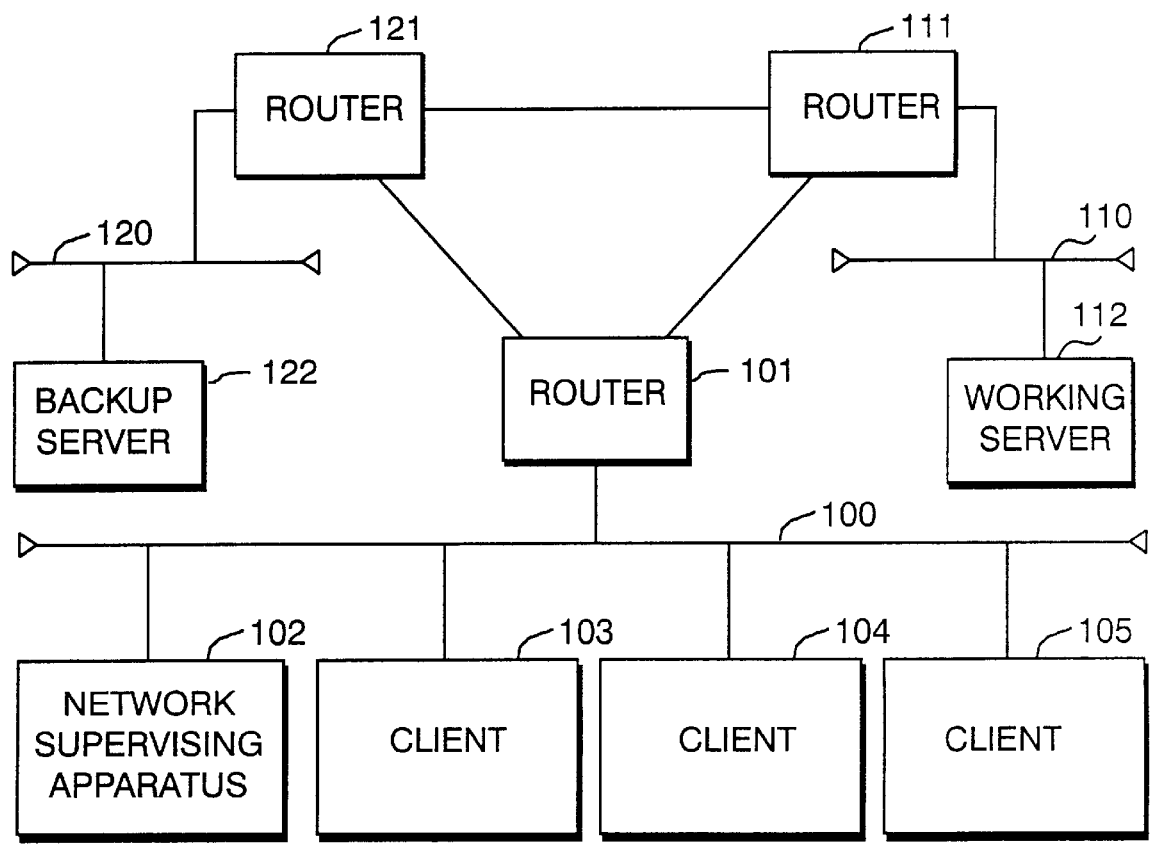
FIG. 1 illustrates a schematic structure of a high reliability network system according to a first embodiment of the present invention.

FIG. 1 illustrates a schematic structure of a high reliability network system according to the first embodiment. In FIG.

1, reference numerals 100, 110 and 120 designate LANs; 101, 111 and 121, routers; 102, a network supervising apparatus; 103 to 105, clients; 112, a working server; and 122, a backup server. LANs 100, 110 and 120 are connected with routers 101, 111 and 121. LAN 100 is connected with the network supervising apparatus 102 and clients 103 to 105. LAN 110 is connected with the working server 112 while LAN 120 is connected with the backup server 122. The network supervising apparatus 102 of the high reliability network system of this embodiment supervises operations of the working server 112 connected to LAN 110 and the backup server 122 connected to LAN 120. According to this embodiment, routers 101, 111 and 121, network supervising apparatus 102, working server 112 and backup server 122 are communication apparatuses supporting the protocol for transferring the server function, while the clients 103 to 105 are conventional client computers not supporting the protocol for transferring the server function.

Figure 2:
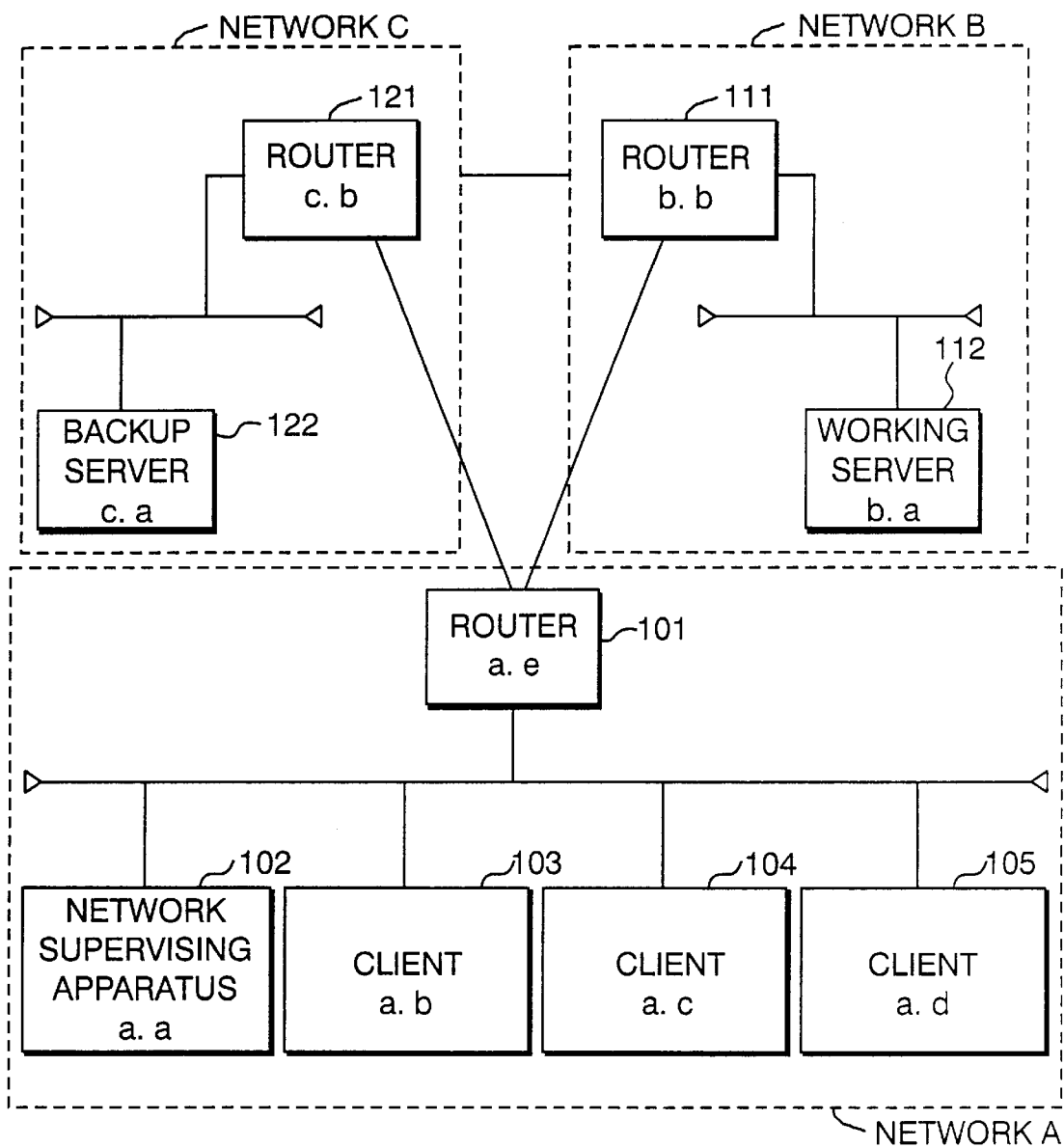
FIG. 2 illustrates an example of network addresses of the high reliability network system according to the first embodiment.

FIG. 2 illustrates an example of the network addresses of the high reliability network system of the first embodiment. The network addresses of the high reliability network system of this embodiment are set as follows: "a.a" is set as the address of the network supervising apparatus 102; "a.b" to "a.d" as the addresses of the clients 103 to 105; "a.e" as the address of router 101; "b.a" as the address of working server 112; "b.b" as the address of router 111; "c. a" as the address of backup server; and "c.b" as the address of router 121.

The addresses set forth above are addresses of the network layer such as IP addresses, etc. used for the routing process by the routers 101, 111 and 121. The address of the network layer is formed of a network portion (or part) and host portion (or part). For example, the network portion of the address of the network supervising apparatus 102 is defined by "a" and the host portion is defined by "a", the address of the network portion of the addresses of the clients 103 to 105 is defined as "a" and the host portion is defined as "b", "c" and "d", respectively.

Figure 3:
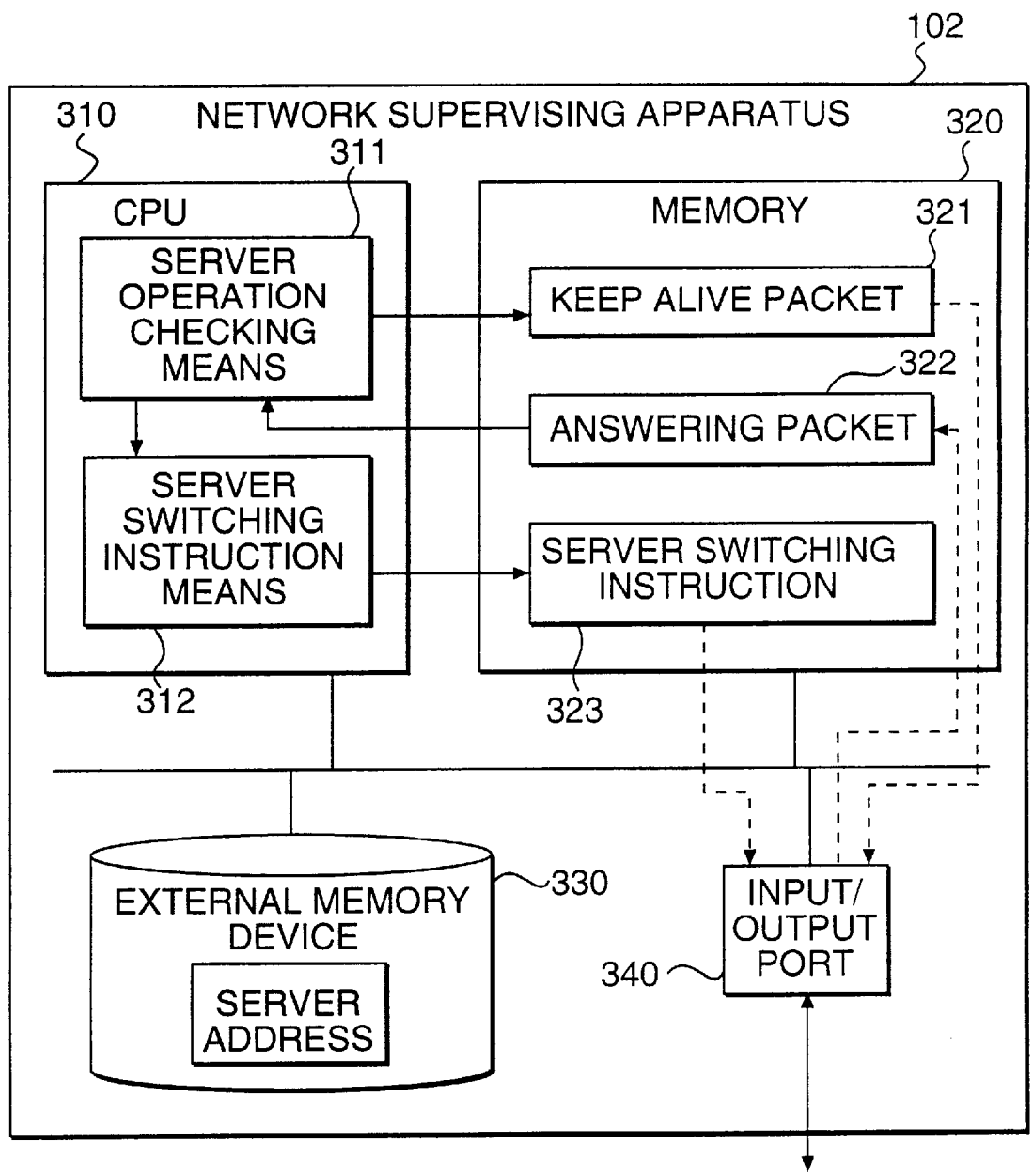
FIG. 3 illustrates a schematic structure of a network supervising apparatus 102 in the high reliability network system of the first embodiment.

FIG. 3 illustrates a schematic structure of the network supervising apparatus 102 of the high reliability network system of this embodiment. In FIG. 3, the reference numeral 310 designates CPU; 311, a server operation checking means; 312, a server switching instruction means; 320, a memory; 321, a keep alive packet; 322, an answering packet; 323, a server switching instruction; 330, an external memory device; and 340, an input/output port. CPU 310 is provided with the server operation checking means 311 and server switching instruction means 312. Memory 320 stores the keep alive packet 321, answering packet 322 and server switching instruction 323. External memory device 330 stores the address of the server to be supervised. Input/output port 340 is provided for inputting or outputting packets. The connections between the various elements of the network supervising apparatus 102 is as illustrated in FIG. 3.

The server operation checking means 311 transmits the keep alive packet 321 to the working server 112 and backup server 122 and receives the answering packet from the working server 112 and backup server 122 to check operations of the server computers. The server switching instruction means 312 transmits, when the answering packet 322 is not received from the working server 112, the server switching instruction 323 to the backup server 122 to execute the server function in place of the working server 112.

Figure 4:
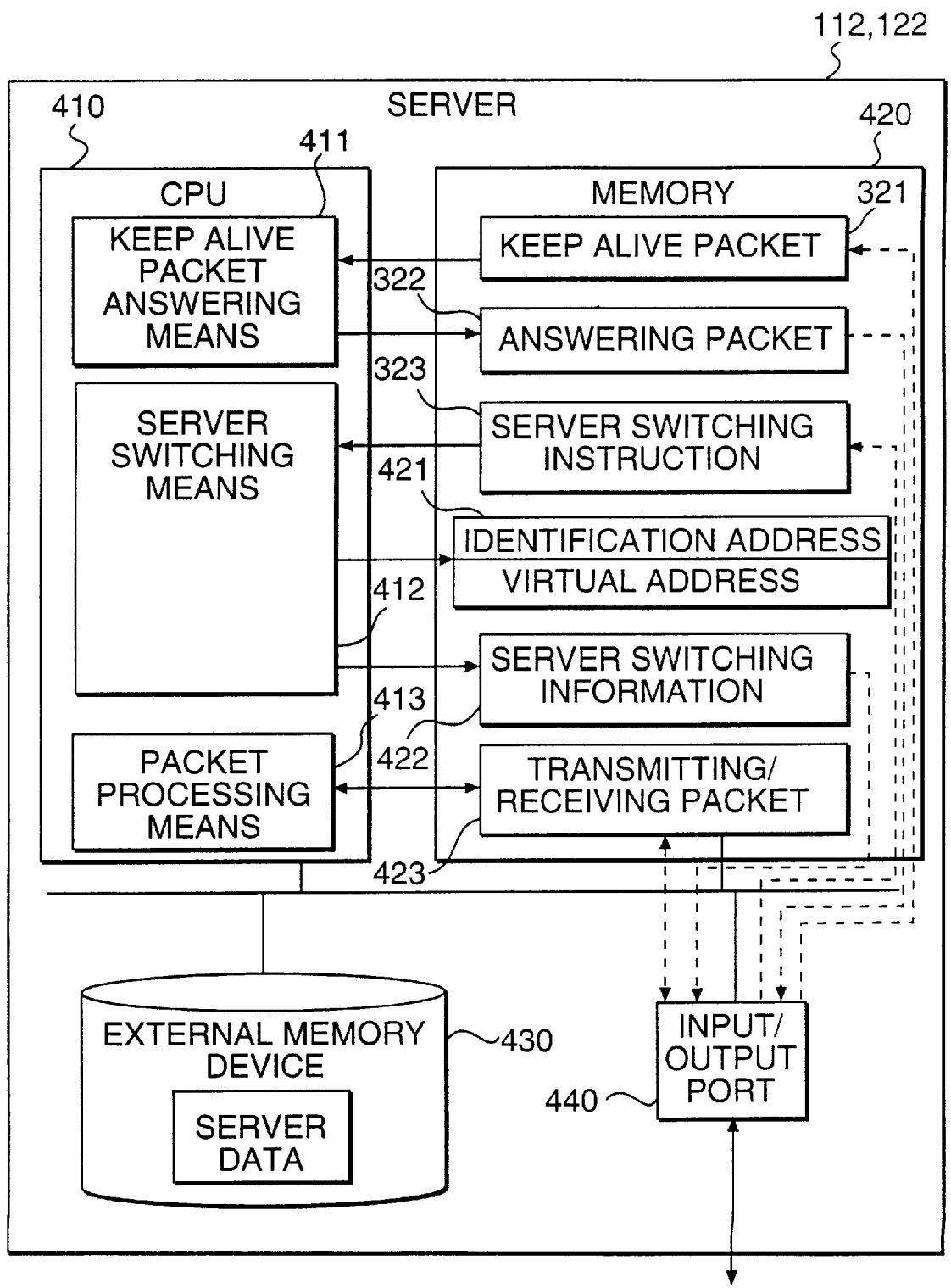
FIG. 4 illustrates a schematic structure of a server computer of the high reliability network system of the first embodiment.

FIG. 4 illustrates the server computer in the high reliability network system of the first embodiment. The server computer includes a CPU 410, keep alive packet response means 411, server switching means 412, packet processing means 413, memory 420, address table 421, server switching information 422, transmitting/receiving packet 423, external memory device 430 and input/output port 440. CPU 410 is provided with the keep alive packet response means 411, server switching means 412 and packet processing means 413. A memory 420 stores the keep alive packet 321, answering packet 322, server switching instruction 323, address table 421, server switching information 422 and transmitting/ receiving packet 423. An external memory device 430 stores the server data. An input/output port 440 is provided for inputting and outputting the packets. These various elements are connected in the manner illustrated.

The keep alive packet response means 411 of the server computer transmits the answering packet 322 to the network supervising apparatus 102, upon reception of the keep alive packet 321 transmitted from the network supervising apparatus 102. The server switching means 412 virtually sets the address of the particular server computer connected to the network as the address of the relevant server computer to alternatively execute the server function of the particular server computer with the relevant server computer. Moreover, the server switching means 412 also changes the contents of the address table 421 to transmit the server switching information 422 to the routers 101, 111 and 121 when it has received the server switching instruction 323 from the network supervising apparatus 102. In the address table 421, the identification address for identifying the intrinsic transmitting destination of the receiving packet and the virtual address for actually receiving the receiving packet are stored. The packet processing means 413 refers to the contents of a header in the transmitting/receiving packet 423 to be transmitted to or received from the clients 103 to 105 and changes the contents of the header as required.

Figure 5:
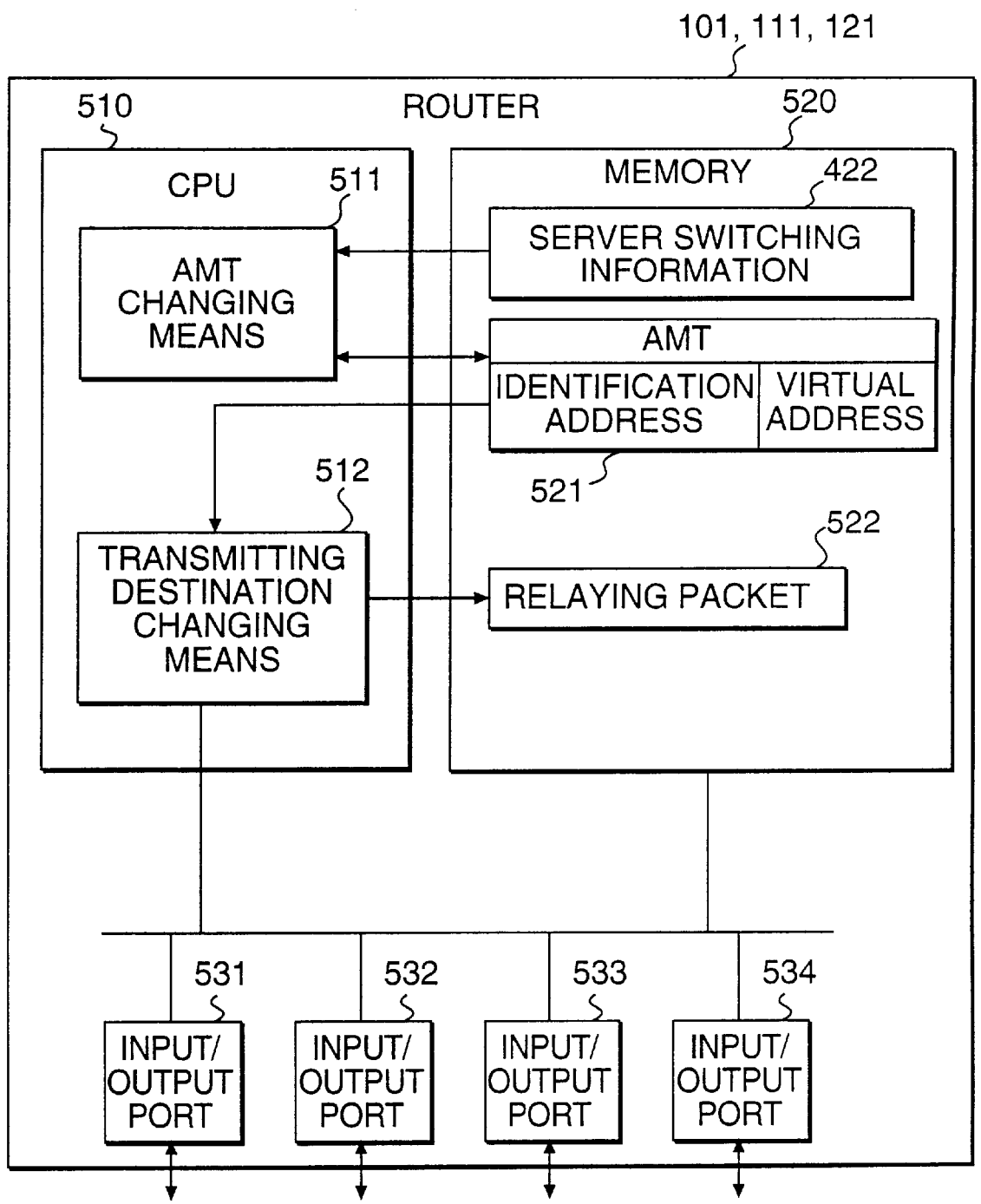
FIG. 5 illustrates a schematic structure of routers 101, 102 and 103 of the high reliability network system of the first embodiment.

FIG. 5 illustrates the routers 101, 111 and 121 of the high reliability network system of the first embodiment. As shown in FIG. 5, the routers 101, 111 and 121 each include a CPU 510, AMT (address mapping table) changing means 511, transmitting destination changing means 512, memory 520, AMT 521, relaying packet 522 and input/output ports 531 to 534. CPU 510 is provided with an AMT changing means 511 and transmitting destination changing means 512. Memory 520 stores the server switching information 422, AMT 521 and relaying packet 522. Input/output ports 531 to 534 are provided for inputting/outputting these packets. The various elements discussed above are connected to one another in the manner illustrated.

The AMT changing means 511 changes the contents of AMT 521 depending on contents of the server switching information when it has received the server switching information 422 from the server computer. The transmitting destination changing means 512 executes, when the destination address of the relaying packet 522 to be relayed by the routers 101, 111 and 121 is the identification address of the server computer completing the switching of server in the AMT 521, the conversion of the relevant packet of which transmitting destination is changed to the virtual address of the server computer after the server switching.

Figure 6:
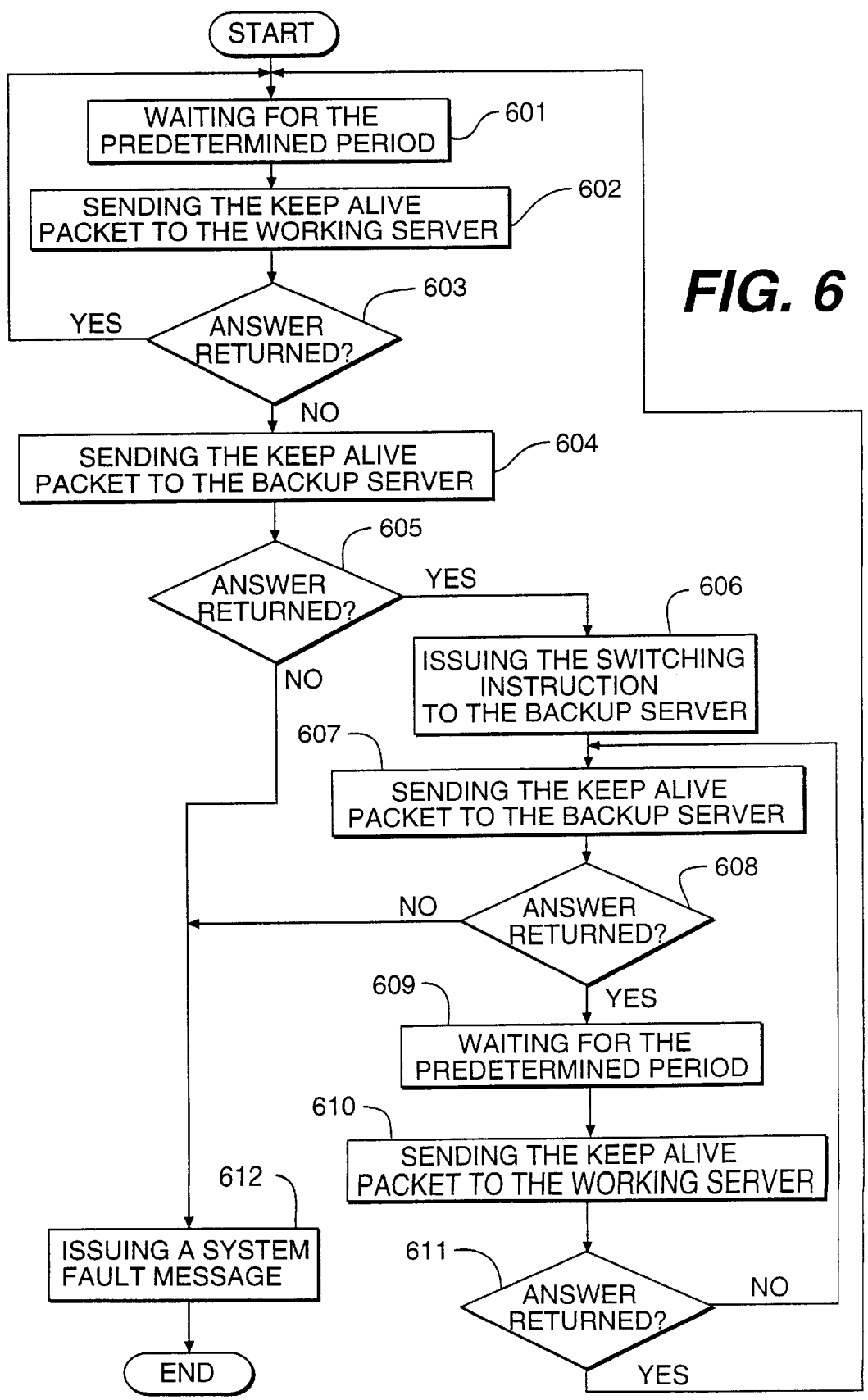
FIG. 6 is a flowchart showing the processing sequence of the server switching process in the high reliability network system of the first embodiment.

FIG. 6 is a flowchart showing the processing sequence of the server switching process in the high reliability network system of the first embodiment. As shown in FIG. 6, when a fault occurs in the working server 112 having the address "b.a" making communication with the clients 103 to 105 with addresses "a.b", "a.c" and "a.d" and no response can be returned to the processing request in the server switching operation, the network supervising apparatus 102 with the address "a.a" detects occurrence of fault in the working server 112 to execute the server switching operation. The server operation checking means 311 generates, after the predetermined time has passed (step 601), the keep alive packet 321 in the memory 320 and transmits the keep alive packet 321 to the working server 112 via the input/output port 340 (step 602). Upon reception of the keep alive packet 321 from the network supervising apparatus 102, the keep alive packet answering means 411 of the working server 112 generates the answering packet 322 and transmits it to the network supervising apparatus 102.

At step 603, the server operation checking means 311 of the network supervising apparatus 102 checks whether or not an answer has been returned from the working server 112. When the means 311 receives the answering packet 322 from the working server 112, the process returns to step 601 and means 311 continuously checks the operation of the working server 112 by periodically transmitting the keep alive packet 321. When it is detected, as a result of the check for the answer from the working server 112 by the server operation checking means 311 of the network supervising apparatus 102, that no answering packet 322 is received from the working server 112, the process continues to the step 604. At step 604, the server operation checking means 311 of the network supervising apparatus 102 generates the keep alive packet 321 and transmits it to the backup server 122. The keep alive packet answering means 411 of the backup server 122 generates, upon reception of the keep alive packet 321 from the network supervising apparatus 102, the answering packet 322 and transmits it to the network supervising apparatus 102. With the processing in the step 605, the server operation checking means 311 of the network supervising apparatus 102 checks whether or not the answer is returned from the backup server 122. When the answering packet 322 is received from the backup server 122, processing goes to step 606 and when the answering packet 322 is not received from the backup server 122, processing goes to the step 612.

At step 606, the server switching instruction means 312 of the network supervising apparatus 102 generates a server switching instruction 323 causing the backup server 122 to alternatively execute the server function of the working server 112 and then transmits this instruction to the backup server 122. The server switching means 412 in the backup server 122 changes, upon reception of the server switching instruction 323 from the network supervising apparatus 102, the identification address in the address table 421 to the address of the working server 112. Namely, although the identification address "c.a" and the virtual address "c.a" are set in the address table 421 of the backup server 122, the value of only the identification address is changed to the address "b.a" of the working server 112. Thus, it is possible to create a situation as if the working server 112 were moving to LAN 120 and operating by acquiring the virtual address "c.a" by changing the identification address value of the backup server 122 to "b.a".

Next, the server switching means 412 of the backup server 122 generates the server switching information 422 indicating that the server function of the working server 112 is transferred to the backup server 122 and thereby the identification address "b.a" corresponds to the virtual address "c.a" and then transmits this information to the router 111. The AMT changing means 511 of the router 111 changes, upon reception of the server switching information from the backup server 122, the virtual address corresponding to the identification address "b.a" within AMT 521 to "c.a" for mapping the address of the working server 112 to the backup server 122.

At step 607, the server operation checking means 311 of the network supervising apparatus 102 generates the keep alive packet 321 and then transmits this packet to the backup server 122. The keep alive packet answering means 411 of the backup server 122 generates, upon reception of the keep alive packet 321 from the network supervising apparatus 102 even after changing of the address table 421, the answering packet 322 and then transmits this packet to the network supervising apparatus 102.

At step 608, the server operation checking means 311 of the network supervising apparatus 102 checks whether or not an answer is returned from the backup server 122. When the answering packet 322 is received from the backup server 122, the processing goes to step 609 and if the answering packet 322 is not received from the backup server 122, the processing goes to step 612. The server operation checking means 311, after waiting for the predetermined period (step 609), transmits the keep alive packet 321 to the working server 112 (step 610).

While the working server 112 is ready for operation, the keep alive packet answering means 411 of the working server 112 generates, upon reception of the keep alive packet 321 from the network supervising apparatus 102, the answering packet 322 and then transmits this packet to the network supervising apparatus 102. The server operation checking means 311 of the network supervising apparatus 102 checks whether or not an answer has been returned from the working server 112 in step 611. When the answering packet 322 is received from the working server 112, the server is switched to the working server from the backup server 112 and the processing returns to step 601.

When it is detected that the answering packet 322 is not received from the working server 112 as a result of the check for the answer from the working server 112 by the server operation checking means 311 of the network supervising apparatus 102 in step 611, the processing returns to the step 607 to continuously check the operations of the backup server 122. On the other hand, when it is detected that the answering packet 322 is not received from the backup server 122 as a result of check for the answer from the backup server 122 by the server operation checking means 311 of the network supervising apparatus 102 in the step 605 or 608, the processing goes to the step 612 and a system fault message is outputted to complete the server switching operation.

Thus, since the network supervising apparatus 102 monitors operations of the working server 112, if no answer is returned from the working server 112, the working server 112 may be switched to the backup server 122 through the server switching operation. Moreover, since the network supervising apparatus 102 is monitoring the operations of the working server 112 in the high reliability network system of this embodiment even after the server switching is performed to the backup server 122 from the working server 112, when the answer is received from the working server 112, the server switching may be executed to the working server 112 from the backup server 122.

Figure 7:
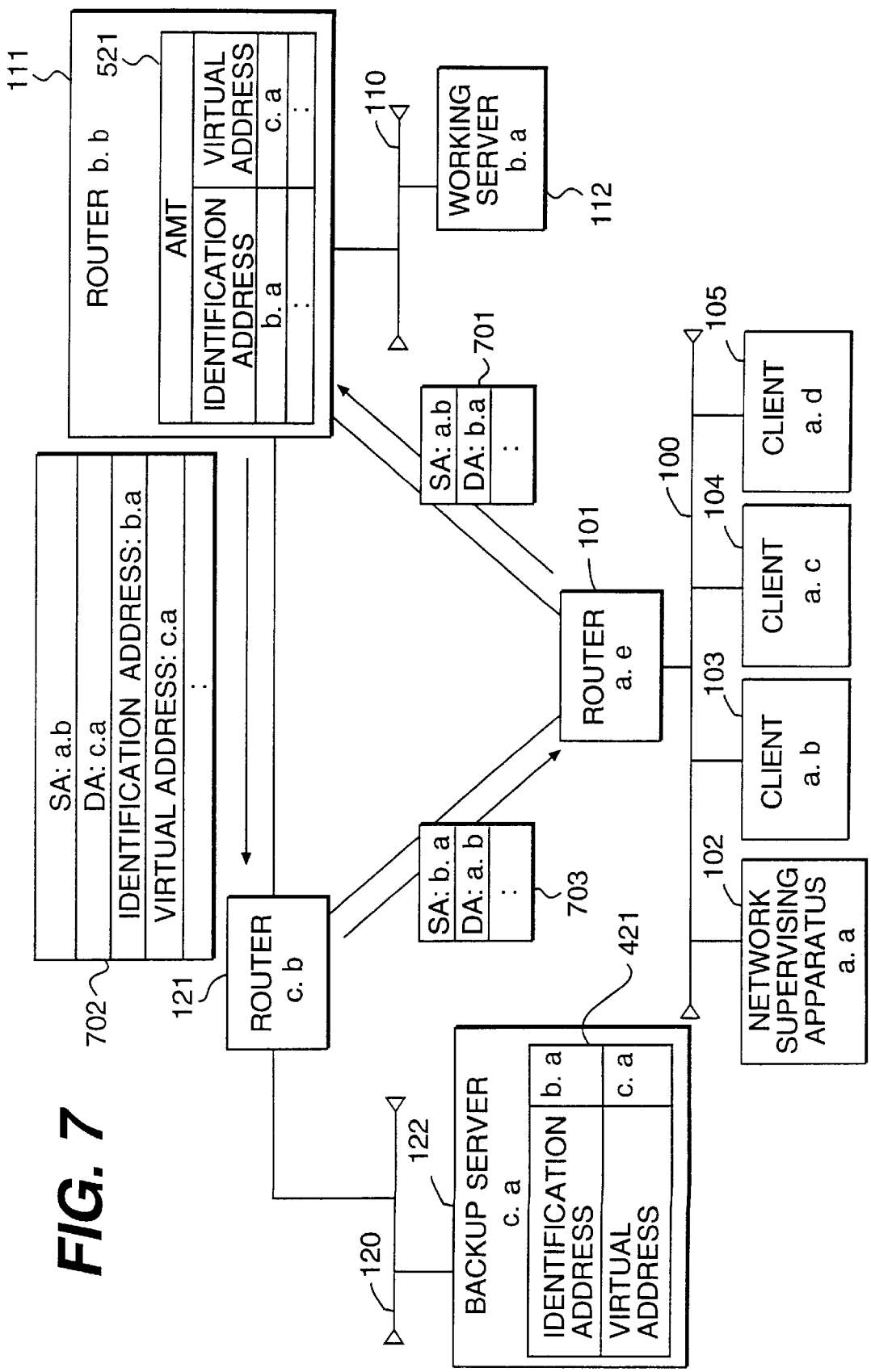
FIG. 7 illustrates an example of packet transfer of the high reliability network system of the first embodiment.

FIG. 7 illustrates an example of the packet transfer operation in the high reliability network system of the first embodiment with respect to data packets 701 to 703. The packet transfer of this embodiment is conducted in such a manner that a client 103 sends the data packet 701 to the working server 112 while the server function of the working server 112 is performed by the backup server 122 and thereby receives the data packet 703 therefrom as the answering packet. In the data packets 701 to 703 shown in FIG. 7, SA means the source address, while DA, the destination address.

Figure 8:
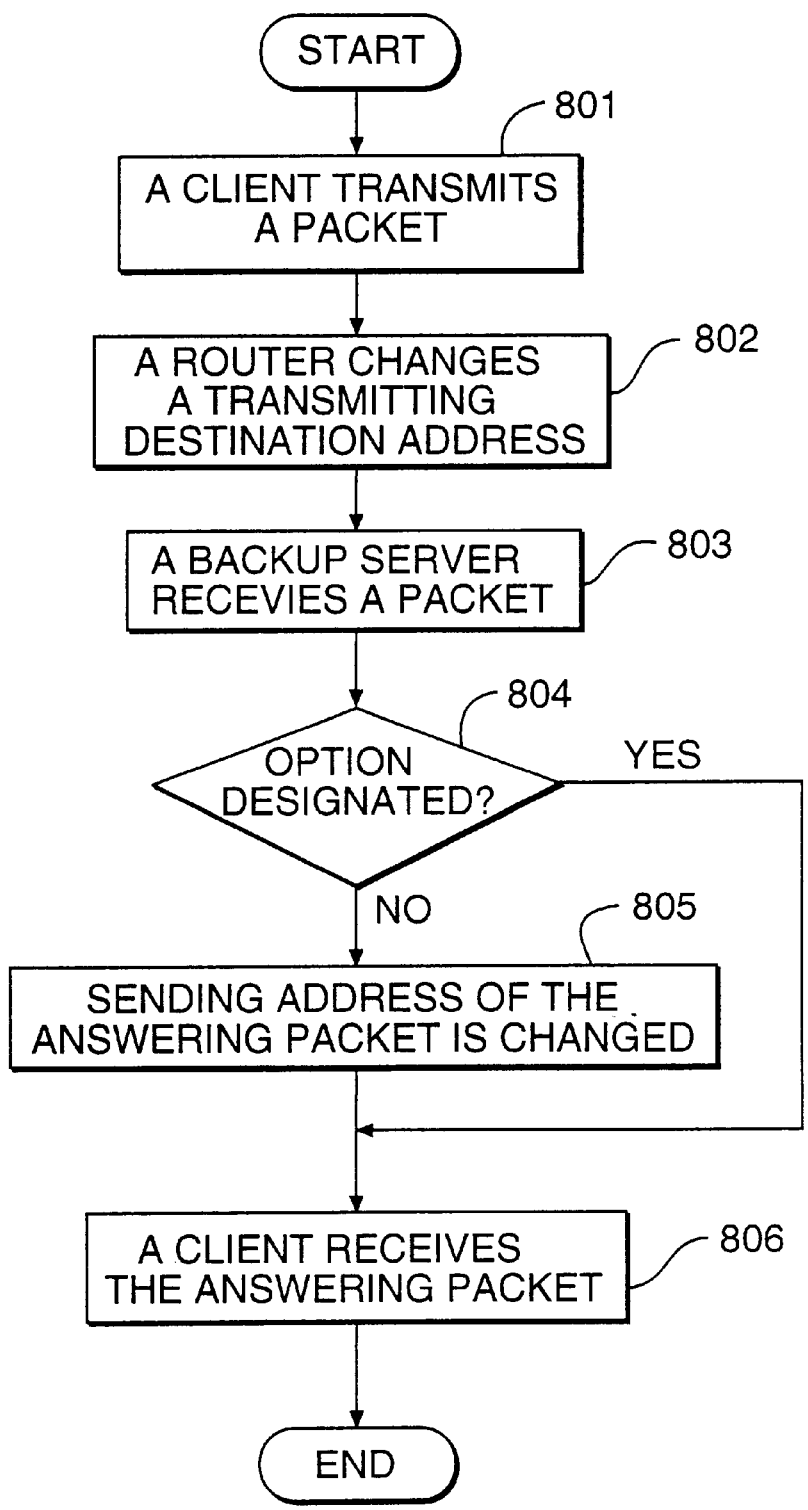
FIG. 8 is a flowchart showing the processing sequence of the packet transfer process in the high reliability network system of the first embodiment.

FIG. 8 is a flowchart showing the processing sequence of the packet transfer process in the high reliability network system of the first embodiment. The packet transfer process is performed as follows when communication is made to the working server 112 from the client 103 after the working server 112 is switched to the backup server 122.

First, in step 801, client 103 transmits a data packet 701 having the address "b.a" of the working server 112 as the destination address. When the router 111 receives the data packet 701 transmitted from the client 103 in step 802, a destination changing means 512 of the router 111 refers to AMT 521 to change the destination address of the data packet 701 from the address "b. a" of the working server 112 to the address "c.a" of the backup server 122 and moreover stores the identification address and virtual address of the backup server 122 to the field for storing option of the data packet 701 and also generates and transmits the data packet 702.

Next, in step 803, the packet processing means 413 of the backup server 122 executes a corresponding process by receiving the data packet 702 and processing continues to step 804. At step 804, the packet processing means 413 of the backup server 122 checks whether or not the identification address and virtual address of the backup server 122 are stored as the option of the received data packet 702. The packet processing means 413 of the backup server 122 changes, when the identification address and virtual address of the backup server 122 are stored as the option in the received data packet 702, the source address of the data packet 703 to the identification address "b.a" and transmits this address to the client 103 in step 805. Moreover, in step 804, when it is detected, as a result of checking by the packet processing means 413 of the backup server 122 that the identification address and virtual address of the backup server 122 are not stored in the received data packet 702, the data packet 703 is transmitted to the client 103 without any change. Finally, at step 806, the client 103 receives the data packet 703 as the answer of the data packet 701 from the backup server 122.

Thus, when the client 103 makes communication with the working server 112 after the working server 112 is switched to the backup server 122 in the high reliability network of this embodiment, the data packet 701 which the client 103 has received is then transmitted to the backup server 122 via the router 111. For the transmission to client 103 of the answer to data packet 701, the backup server 122 generates data packet 703 for which the source address is changed to the address of working server 112. Therefore, client 103 can continue operation as if it were making communication with working server 112 even after the server switching is made to backup server 122.

In addition, since the identification address and virtual address of the backup server 122 are stored as the option in the data packet 702 for which the destination address is changed by means of the server switching, the communication using the packet destined to the working server 112 depending on the server switching and the communication using the packet destined to the backup server 122 not depending on the server switching can be realized by checking contents of the option explained above. Also, since the server switching is performed by setting the address of the working server 112 as the identification address of the backup server 122 and then changing contents of header of the packet, the server switching may be conducted without stopping operation of the network.

In the discussion above, the address "c.a" of the backup server 122 has been set as the virtual address of the backup server 122, but it is also possible to set the virtual address and host name to alternatively execute the server function of the working server 112 and to set also such virtual address as that of the backup server 122 by utilizing a dynamic address applying mechanism and dynamic name management mechanism. In addition, it is possible that routers 101, 111, and 121 respectively include the network supervising apparatus to supervise the working server 112 and backup server 122.

Furthermore, since the dynamic server switching to the backup server from the working server is performed by virtually setting the address of the working server to the backup server when sufficient operation cannot be executed due a fault, for example, occurring in the working server, the server switching to the backup server from the working server can be executed without any change of setting on the client computer. Also, since the destination address of the packet destined to the working server connected to the particular network is changed to the address of the backup server connected to the other network, switching between the working server and backup server connected to different networks can be realized without any change of setting on the client computer.

Figure 9:
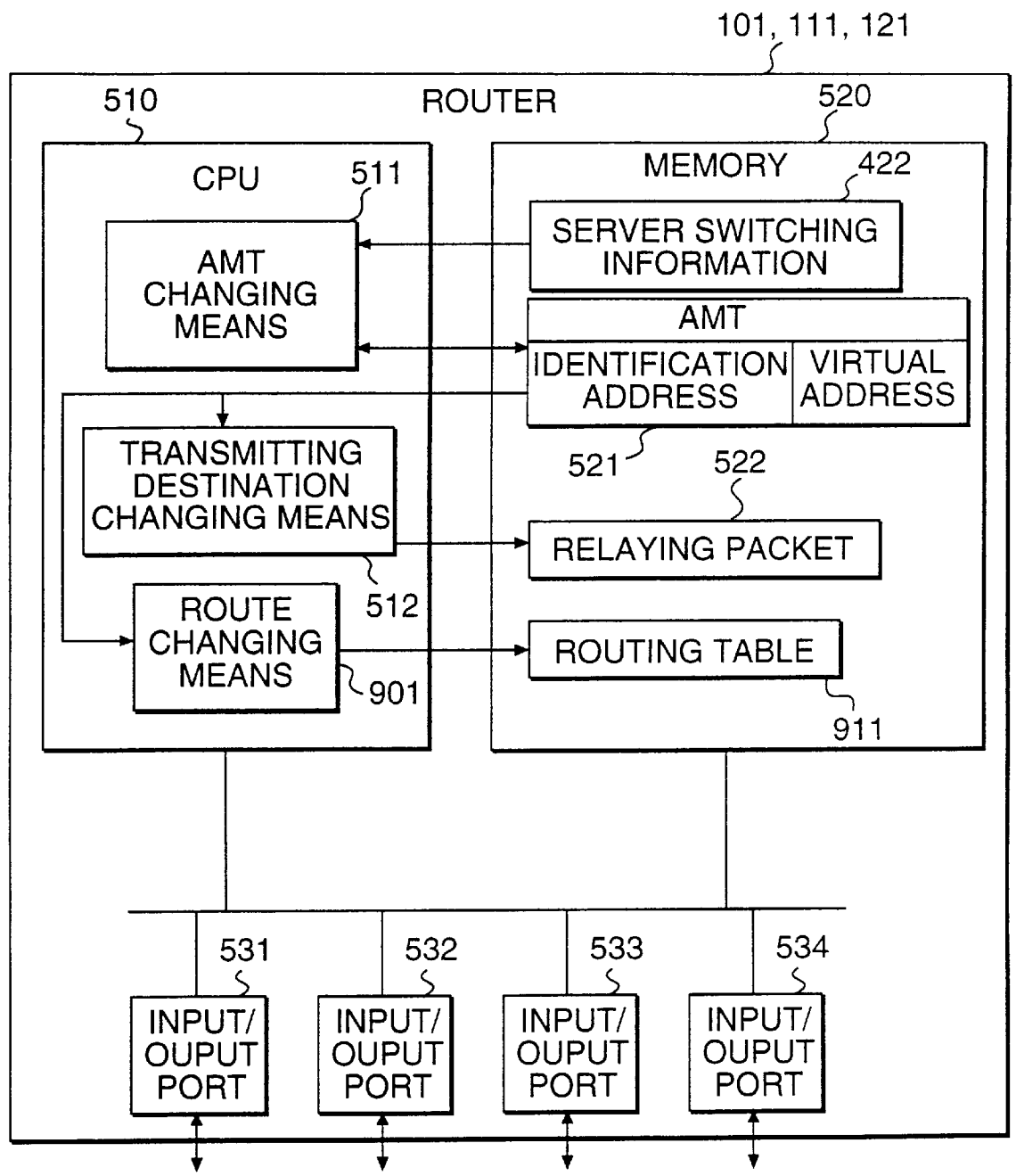
FIG. 9 is a diagram showing a schematic structure of routers 101, 102 and 103 of the high reliability network system according to a second embodiment of the present invention.

FIG. 9 illustrates a schematic structure of the routers 101, 111 and 121 of the high reliability network system according to a second embodiment of the present invention. In FIG. 9, reference numeral 901 designates a route changing means and reference numeral 911 designates a routing table. A CPU 510 is provided with an AMT changing means 511, a transmitting destination changing means 512 and a route changing means 901. A memory 520 stores the server switching information 422, AMT 521, relaying packet 522 and routing table 911. Input/output ports 531 to 534 are provided for inputting and outputting the packets. The various elements are connected to one another in the manner shown.

The route changing means 901 refers to contents of AMT 521 and changes contents of the routing table 911 under the assumption that the server computer indicated by the identification address of AMT 521 is transferred to the position indicated by the virtual address. Described hereunder is the process for changing the contents of the routing table 911 which is executed under the assumption that the server computer indicated by the identification address of ATM 521 is transferred to the position indicated by the virtual address when the route changing means 901 of the routers 101, 111 and 121 of the high reliability network system of this embodiment refers to contents of AMT 521.

The server operation checking means 311 of the network supervising apparatus 102 in the high reliability network system of this embodiment generates the keep alive packet 321 in the memory 320 and transmits the generated keep alive packet 321 to the working server 112 via the input/output port 340. Upon reception of the keep alive packet 321 from the network supervising apparatus 102, the keep alive packet answering means 411 of the working server 112 generates the answering packet 322 and transmits it to the network supervising apparatus 102. The server operation checking means 311 of the network supervising apparatus 102 checks whether or not the answer is returned from the working server 112 and periodically transmits, when the answering packet 322 is received from the working server 112, the keep alive packet 321 to continuously check the operations of the working server 112.

The server operation checking means 311 of the network supervising apparatus 102 checks the answer from the working server 112 and generates, when the answering packet 322 is not received from the working server 112, the keep alive packet 321 and then transmits this packet to the backup server 122. The keep alive packet answering means 411 of the backup server 122 generates, upon reception of the keep alive packet 321 from the network supervising apparatus 102, the answering packet 322 and transmits this packet to the network supervising apparatus 102. The server operation checking means 311 of the network supervising apparatus 102 checks whether or not the answer is returned from the backup server 122. When the answering packet 322 is received from the backup server 122, the server switching instruction means 312 of the network supervising apparatus 102 generates the server switching instruction 323 to instruct the backup server 122 to alternatively execute the server function of the working server 112 and then transmits this instruction to the backup server 122.

The server switching means 412 of the backup server 122 changes, upon reception of the server switching instruction 323 from the network supervising apparatus 102, the identification address in the address table 421 to the address of the working server 112. Namely, a value of the identification address in the address table 421 of the backup server 122 is changed to the address "b.a" of the working server 112.

Then, the server switching means 412 of the backup server 122 generates server switching information 422 which indicates that the server function of working server 112 is transferred to backup server 122 and the identification address "b.a" corresponds to the virtual address "c.a" and then transmits this information to routers 101, 111 and 121. The AMT changing means 511 of routers 101, 111 and 121 changes, upon reception of the server switching information 422 from the backup server 122, the virtual address "c.a" corresponding to the identification address "b.a" in AMT 521 to "c.a" and maps the address of the working server 112 to the backup server 122. Next, the route changing means 901 of routers 101, 111 and 121 changes the contents of the routing table 911 under the assumption that the working server 112 has transferred to the position of the backup server 122.

Figure 10:
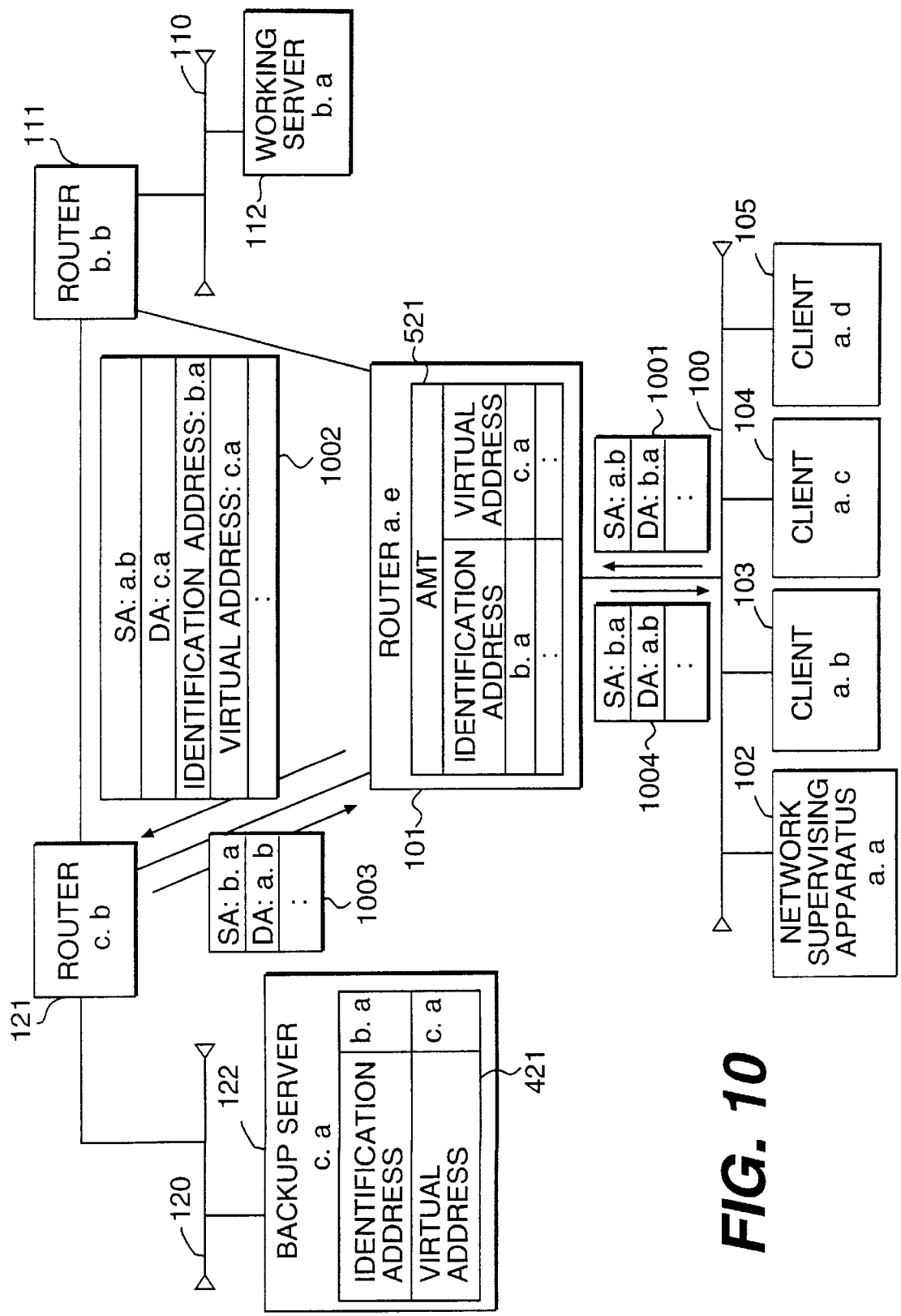
FIG. 10 illustrates an example of packet transfer in the high reliability network of the second embodiment.

FIG. 10 illustrates an example of the packet transfer of the high reliability network system of the second embodiment, where reference numerals 1001 to 1004 designate data packets. Backup server 122 executes the server function of the working server 112 and the client 102 transmits the data packet 1001 to the working server 112 and transmits or receives, at the time of receiving the data packet 1004 as the answering packet, the packet to or from the router 101 via the router 121.

When the client 103 makes communication to the working server 112, after the working server 112 is switched to the backup server 122, the packet transfer process is executed as follows. First, the client 103 sends the data packet 1001 having the address "b.a" of the working server 112 as the transmitting destination. Upon reception of data packet 1001 transmitted from client 103, router 101 refers to the transmitting destination of data packet 1001 and routing table 911 and selects a port to which router 121 is connected among input/output ports 531 to 534 as the next route extended from router 101.

The transmitting destination changing means 512 of router 101 refers to AMT 521 to change the transmitting destination address of the data packet 1001 to the address "c.a" of the backup server 122 from the address "b.a" of the working server 112, stores the identification address and virtual address of the backup server 122 as the option and generates the data packet 1002 to transmit this packet.

Next, the packet processing means 413 of the backup server 122 checks, having received the data packet 1002 and executed the corresponding process, whether or not the identification address and virtual address of the backup server 122 are stored as the option of received data packet 1002. When the identification address and virtual address of the backup server 122 are stored as the option in the received data packet 1002, the packet processing means 413 of the backup server 122 changes the address of the transmitting destination of the data packet 1003 to the identification address "b.a" in order to transmit it to the client 103. When it is detected, as a result of checking by the packet processing means 413 of the backup server 122 whether or not the identification address and virtual address of the backup server 122 are stored as the option of the data packet 1002, that the identification address and virtual address of the backup server 122 are not stored in the received data packet 1002, the data packet 1003 is transmitted to the client 103 without any change of data packet.

Thus, when the client 103 makes communication to the working server 112 after the working server 112 is switched to the backup server 122, the data packet 1001 transmitted by the client 103 is sent to the backup server 122 via the routers 101 and 121. As explained previously, since the routing information destined to the working server 112 is changed, after the working server 112 is switched to the backup server 122, the data packet 1001 transmitted from the client 103 is sent to the backup server 122 without going through the router 111. Also, since the routing information of the router is changed, when the working server is switched to the backup server, under the assumption that the working server is transferred to the position of the backup server, the optimum route to the backup server from the client computer can be selected when the working server is switched to the backup server.

Figure 11:
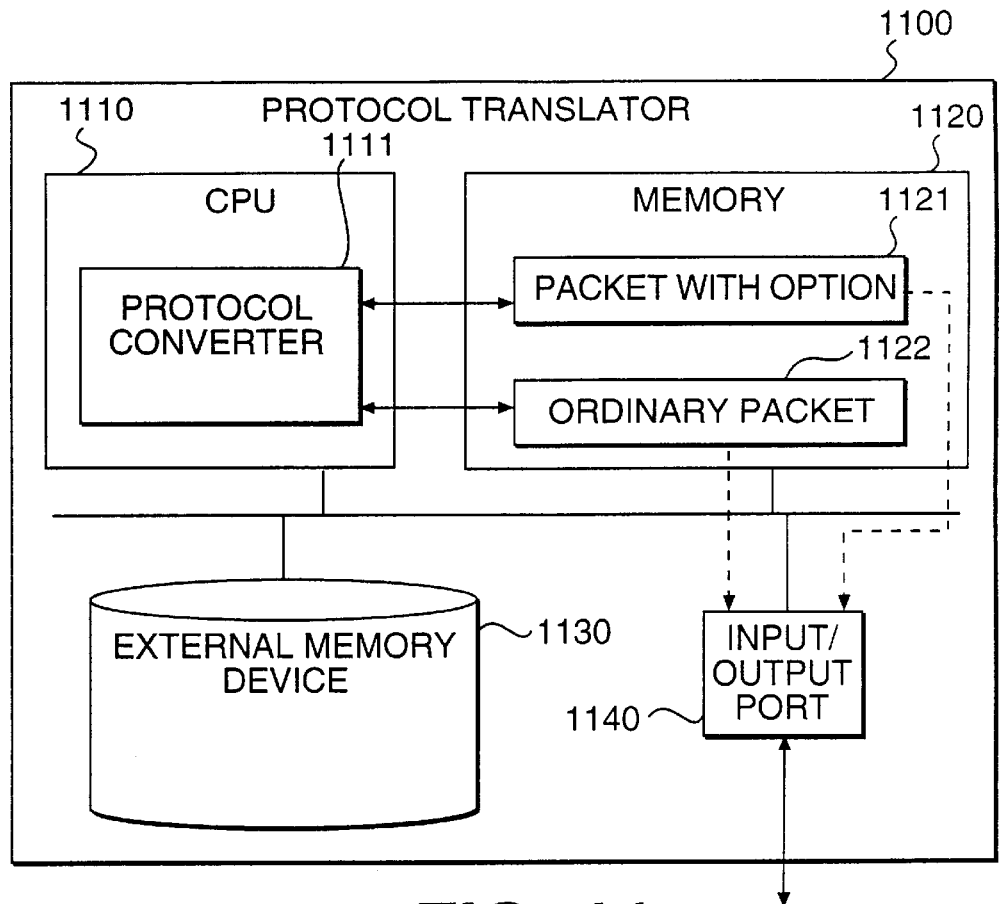
FIG. 11 illustrates a schematic structure of a protocol translator in the high reliability network system according to a third embodiment of the present invention.

FIG. 11 illustrates a schematic structure of a protocol translator of the high reliability network system according to a third embodiment of the present invention. As shown in FIG. 11, the protocol translator includes CPU 1110, protocol converter 1111, memory 120, packet with option 1121, ordinary packet 1122, external memory device 1130 and input/output port 1140. CPU 1110 is provided with a protocol converter 1111. Memory 1120 stores packet 1121 with option and ordinary packet 1122. External memory device 1130 stores information required for protocol conversion. Input/output port 1140 is provided for inputting and outputting the packets. These elements are connected to one another as shown. The protocol converter 1111 of the protocol translator 1100 is a processing part for receiving the packet with option 1121 whose transmitting destination is changed by the server switching to convert this packet to the ordinary packet 1122 destined to the backup server computer having no server switching function.

Figure 12:
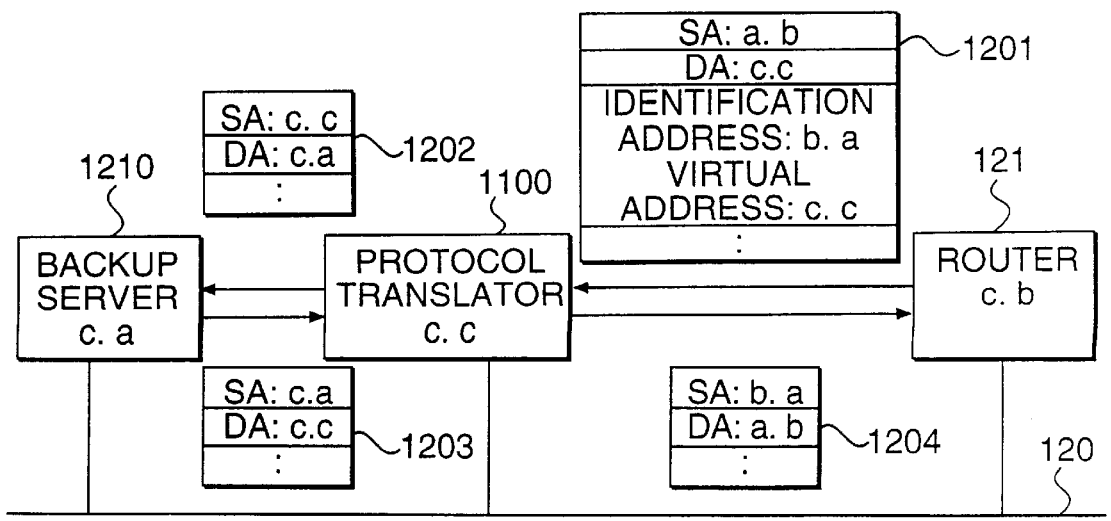
FIG. 12 illustrates an example of protocol conversion in the high reliability network system of the third embodiment.
Figure 13:
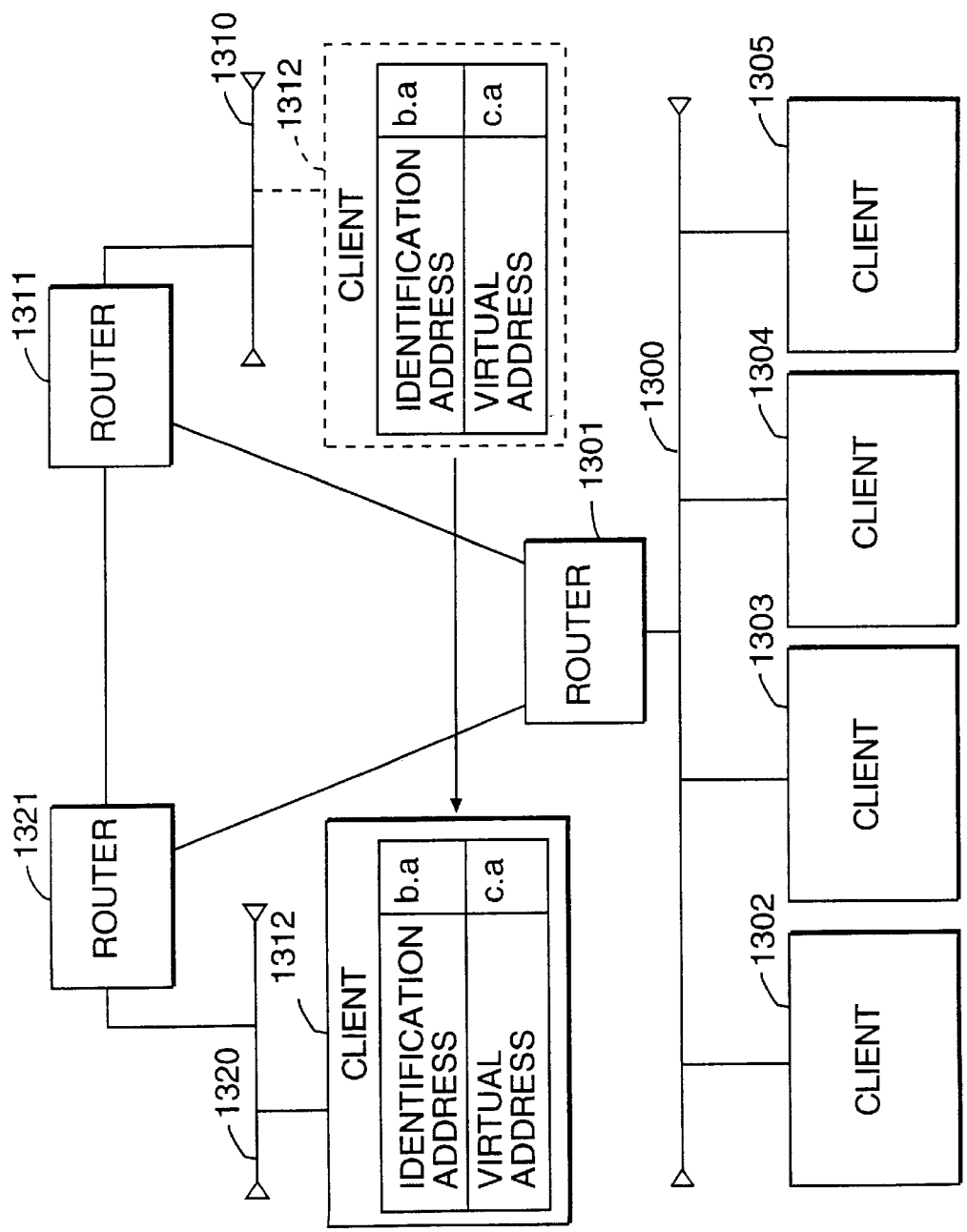
FIG. 13 illustrates a schematic diagram of a network utilizing IP for mobile communication of the related art.

FIG. 12 illustrates an example of protocol conversion by the high reliability network system of this third embodiment. Reference numerals 1201 to 1204 designate data packets and 1210 designates a backup server. The protocol translator 1100 converts the data packet 1201 transferred from the router 121 into an ordinary data packet 1202 to transfer it to the backup server 1210 and transmits the data packet 1204 obtained by changing the address of the ordinary data packet 1203 transmitted from the backup server 1210 to the router 121.

When the client 103 makes communication to the working server 112 after the working server 112 is switched to the backup server 1210, the following packet transfer process is executed. First, the client 103 transmits the transmitting packet having an address "b.a" of the working server 12 as the transmitting destination to the router 101. When the router 101 receives the sending packet transmitted from the client 103, the transmitting destination changing means 512 of the router 101 refers to AMT 521 to change destination address of the sending packet to an address "c.c" of the protocol translator 1100 from the address "b.a" of the working server 112 and moreover stores the identification address and virtual address of the protocol translator 1100 as the option to generate the sending packet and then transmits this packet to the router 121. The router 121 transmits, upon reception of the data packet 1201 of which destination is changed by the router 101, the received data packet 1201 to the protocol translator 1100. When the protocol translator 1100 receives the data packet 1201 transmitted from the router 121, the protocol converting means 1111 of the protocol translator 1100 changes the source address of the data packet 1201 to the address "c.c" of the protocol translator 1100 and the destination address to the address "c.a" of the backup server 1210 and generates the data packet 1202 to send this packet to the backup server 1210.

Next, the packet processing means 413 of the backup server 1210 generates, after completing the corresponding process by receiving the data packet 1202, the data packet 1203 as the answering packet of the received data packet 1202 and sends this data packet to the protocol translator 1100. Upon reception of the data packet 1203 from the backup server 1210, the protocol converting means 1111 of the protocol translator 1100 changes the source address of the data packet 1203 to the virtual address "b.a" and the destination address to the source address "a.b" of the data packet 1201 and then sends these addresses to the client 103.

Thus, when the client 103 makes communication with the working server 112 after the working server 112 is switched to the backup server 1210, the data packet 1201 from the router 121 is transmitted to the backup server 1210 via the protocol translator 1100. In the second embodiment, the working server 112 and backup server 122 are provided corresponding to the protocol for server switching, but the actual server system is complicated and therefore it is sometimes difficult to provide the servers corresponding to the newly provided protocol.

In the case described above, a protocol translator 1100 for assisting the server computer is provided corresponding to the protocol for the server switching in the same segment for the server computer not corresponding to the protocol to execute the server switching and the server switching is performed by such protocol translator 1100. Moreover, it is also possible that the protocol translator 1100 includes routers 101, 111 and 121 to assist the server computer not corresponding to the protocol for executing the server switching by means of the routers 101, 111 and 121. Since the packet destined to the working server is converted to the packet destined to the backup server after the working server is switched to the backup server, server switching to the backup server which does not have the server switching function can be realized.

Although preferred embodiments of the present invention have been described and illustrated, it will be apparent to those skilled in the art that various modifications may be made without departing from the scope and spirit if the present invention as recited in the appended claims.

For example, if a fault occurs only in the working server 112 and server switching is conducted, the packet transmitted from the clients 103 to 105 is received by the backup server 122 with certainty because the routers 101, 111 and 121 are operating. But if a particular router has a fault in the system consisting of many stages of routers 101, 111 and 121, not only may the reliability of transmission to the working server 112 from the clients 103 to 105 be deteriorated but also the change of virtual address generated at the time of server change to the backup server 122 may not be transferred to all routers 101, 111 and 121 in some cases. In such a case, it is sufficient the when the network supervising apparatus 102 supervises all routers 102, 111 and 121, not only is the server switching instruction 323 sent to the backup server 122 when a fault is occurring but also the server switching information 422 indicating that the server switching has been conducted can be transmitted to the routers 101, 111 and 121.

Furthermore, reliability can be further improved by connecting a plurality of units of the network supervising apparatus 102 to execute the double and triple supervising functions to the routers 101, 111 and 121.

Also, when a processing load of the working server 112 becomes high and response from the working server 112 is lowered in the high reliability network system of this embodiment, it is possible to realize distribution of load by partially sending the packet destined to the working server 112 to the backup server 122.

The following is a brief summary of some of the advantages provided by the present invention.

(1) Since the dynamic server switching is conducted to the backup server from the working server by virtually setting the address of the working server for the backup server when the sufficient process can no longer be continued due to some reasons such as a fault occurring in the working server, the working server can be switched to the backup server without changing the setting on the client computer.

(2) Since the destination address of the packet destined to the working server connected to the particular network is changed to the address of the backup server connected to the other network, server switching can be realized between the working server and backup server connected to different networks without changing any setting on the client computer.

(3) Since the routing information of router is changed when the working server is switched to the backup server under the assumption that the working server is transferred to the position of the backup server, the optimum route to the backup server from the client computer can be selected when the working server is switched to the backup server.

(4) Since the packet destined to the working server is converted to the packet destined to the backup server after the working server is switched to the backup server, server switching to the backup server having no server switching function can be realized.

What is claimed is:

1. A network system, comprising:
   a first server computer;
   a second server computer;
   at least one client computer connected to a network;
   a network supervising means for supervising operations of the first server computer, and for instructing a server switching means that the second server computer is executed in place of the first server computer;
   the server switching means for setting an identification address, that is a network address of the first server computer, and a virtual address, that is a network address of the second server computer and corresponds to the identification address, in an address table of the second server computer in response to the server switching instruction;

packet converting means for setting an identification address and a virtual address in an address mapping table of the a packet converting means in response to the server switching instruction, and for transmitting a packet after executing the conversion of the packet of which transmitting destination is changed to the virtual address, when the destination address of the packet received from the at least one of client computer corresponds to the identification address to be set in the address mapping table; and the second server computer for setting a source address of an answering packet to the identification address, when the second server computer transmits the answering packet to the at least one client computer in request to the packet.

2. A network system according to claim 1, wherein the first server computer is on a first network, the second server computer is on a second network and the first and second networks are connected via an internetwork apparatus.

3. A network system according to claim 2, further comprising a route changing means for changing a route of the packet transmitted and received between the first server computer and the client computer to a route of the packet transmitted and received between the second server computer and the client computer for which server switching has been conducted.

4. A network system according to claim 3, further comprising a protocol translator for converting, when the first server computer is switched to the second server computer having no server switching function, the packet transmitted to the first server computer from the client computer to the packet destined to the second server computer.

5. A network system according to claim 2, further comprising a protocol translator for converting, when the first server computer is switched to the second server computer having no server switching function, the packet transmitted to the first server computer from the client computer to the packet destined to the second server computer.

6. A network system according to claim 1, further comprising a route changing means for changing a route of the packet transmitted and received between the first server computer and the client computer to a route of the packet transmitted and received between the second server computer and the client computer for which server switching has been conducted.

7. A network system according to claim 6, further comprising a protocol translator for converting, when the first server computer is switched to the second server computer having no server switching function, the packet transmitted to the first server computer from the client computer to the packet destined to the second server computer.

8. A network system according to claim 1, further comprising a protocol translator for converting, when the first server computer is switched to the second server computer having no server switching function, the packet transmitted to the first server computer from the client computer to the packet destined to the second server computer.

9. A network system, comprising:

a first server computer;

a second server computer;

at least one client computer connected to a network;

a network supervising apparatus for supervising operations of the first server computer, and for instructing a server switching means that the second server computer is executed in place of the first server computer;

a first router for setting an identification address, that is a network address of the first server computer, and a virtual address, that is a network address of the second server computer and corresponds to the identification address, in an address table of the second server computer in response to the server switching instruction;

a second router for setting an identification address and a virtual address in an address mapping table of a packet converting means in response to the server switching instruction, and for transmitting a packet after executing the conversion of the packet of which transmitting destination is changed to the virtual address, when the destination address of the packet received from the at least one client computer corresponds to the identification address to be set in the address mapping table; and the second server computer for setting a source address of an answering packet to the identification address, when the second server computer transmits the answering packet to the at least one client computer in request to the packet.

10. The network system according to claim 9, wherein the second server sends an answering packet to the client computer which contains a source address that corresponds to the destination address of the first server such that the client computer does not know which server actually processed its packet.

11. The network system according to claim 10, wherein the first server is located on a first network and the second server is located on a second network, and wherein the first and second networks are connected by an internetwork apparatus.

12. The network system according to claim 11, wherein the first router has a route changing means for redirecting the packet from a route leading to the first server to a route leading to the second server.

13. The network system according to claim 12, further comprising a protocol translator connected between the second router and the second server for performing any protocol conversion needed in order to permit processing of the packet by the second server.

14. The network system according to claim 9, wherein the first server is located on a first network and the second server is located on a second network.

15. The network system according to claim 14, wherein the first router has a route changing means for redirected the packet from a route leading to the first server to a route leading to the second server.

16. The network system according to claim 15, further comprising a protocol translator connected between the second router and the second server for performing any protocol conversion needed in order to permit processing of the packet by the second server.

17. A method for processing a packet in a network system having a first server computer, a second server computer, at least one of client computer and a router which connected between the first server computer and the second server computer the method comprising the steps of:

supervising operations of the first server computer;

instructing the second server computer to execute in place of the first server computer;

setting an identification address, that is a network address of the first server computer, and a virtual address, that is a network address of the second server computer and corresponds to the identification address, in an address table of the second server computer in response to the step of instructing;

setting an identification address and a virtual address in an address mapping table of the router in response to the step of instructing;

transmitting a packet after executing the conversion of the packet of which transmitting destination is changed to the virtual address, when the destination address of the packet received from the at least one client computer corresponds to the identification address is set in the address mapping table; and setting a source address of an answering packet to the identification address, when the answering packet is transmitted to the at least one client computer in response to the packet.

18. The method according to claim 17, wherein the step of setting a source address includes a step of changing a source address of the answering packet from the virtual address of the second server to the destination address of the first server so that the client computer does not know which server processed the packet.

19. A server computer for being used in a network system comprising at least two of server computers and at least one client computer, the server computer comprising:

a server switching means for setting an identification address, that is a network address of an other server computer which is defective, and a virtual address, that is a network address of the own server computer and corresponds to the identification address, in an address table of the own server computer in response to the defection of the other server computer; and a packet processing means for setting a source address of an answering packet to the identification address, when the own server computer transmits the answering packet to the at least one of client computer in request to the packet destined to the other server computer.

20. The server computer according to claim 19, further comprising keep alive packet answering means for receiving a keep alive packet sent from a network supervising apparatus and for sending an answering packet when possible.

21. An internetworking apparatus to be used in a network system comprising at least two of server computers, at least one client computer and the internetworking apparatus, the internetworking apparatus comprising:

a packet converting means for setting an identification address, that is a network address of one of the server computer which is defective, and a virtual address, that is a network address of the other server computer and corresponds to the identification address, in an address table of the other server computer in response to the defection of one of the server computer; and a transmitting destination changing means for transmitting a packet after executing the conversion of the packet of which transmitting destination is changed to the virtual address, when the destination address of the packet destined to the one of the server computer corresponds to the identification address.

22. The internetworking apparatus according to claim 21, further comprising a route changing means for referring to the address mapping table and changing contents of a routing table in accordance with any changes in the address mapping table.

* * * * *